United States Patent

[11] 3,570,516

[72] Inventor Richard K. Mason
Granada Hills, Calif.
[21] Appl. No. 805,268
[22] Filed Mar. 7, 1969
[45] Patented Mar. 16, 1971
[73] Assignee Bell Aerospace Corporation

[54] LATCHING COMPARATOR
6 Claims, 3 Drawing Figs.
[52] U.S. Cl. .................................................. 137/87,
137/625.48, 137/625.6, 137/625.66, 91/25
[51] Int. Cl. ..................................................... F16k 31/12
[50] Field of Search .......................................... 137/625.34,
625.48, 625.66, 469, 87; 91/25, 26, 359

[56] References Cited
UNITED STATES PATENTS
1,986,084   1/1935   Tolkien ........................ 91/25X 2,983,278   5/1961   Heintz ........................... 91/25X
3,391,611   7/1968   Jenny ............................ 91/459
3,406,702   10/1968  Jenny ............................ 137/87

Primary Examiner—Robert G. Nilson
Attorney—Nilsson, Robbins, Wills & Berliner

ABSTRACT: Disclosed is a differential pressure responsive device for comparing pressures applied thereto and upon a predetermined differential between the pressures causing movement of the device through a predetermined distance, force is applied to latch the comparator in its limit position in the direction of movement. The force applied may, for example, be a source of hydraeric pressure. The term "hydraeric" as used throughout this specification and the appended claims is defined as being generic to hydraulic and pneumatic and as synonymous in the broad sense with fluid under pressure.

Patented March 16, 1971 3,570,516
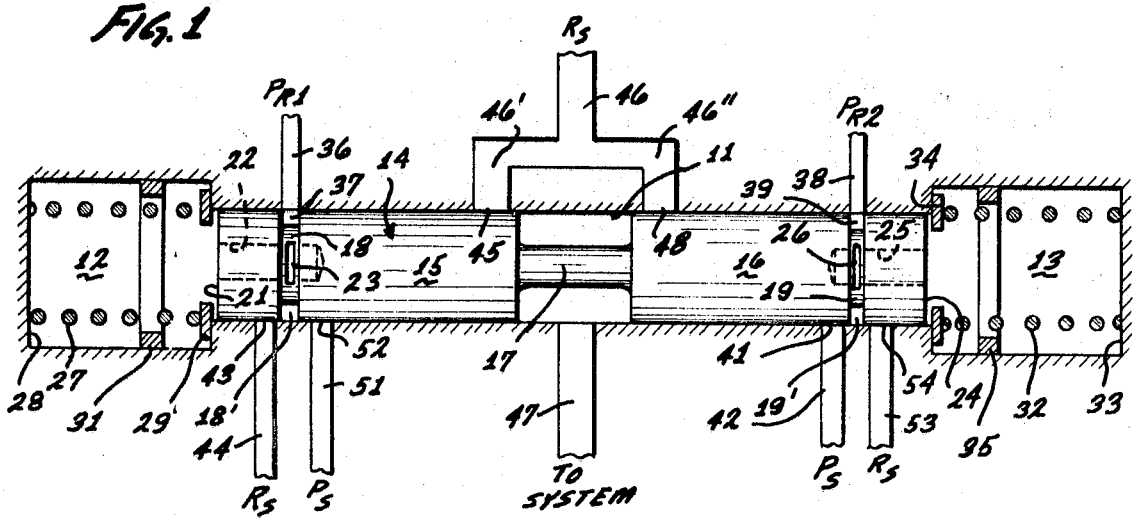
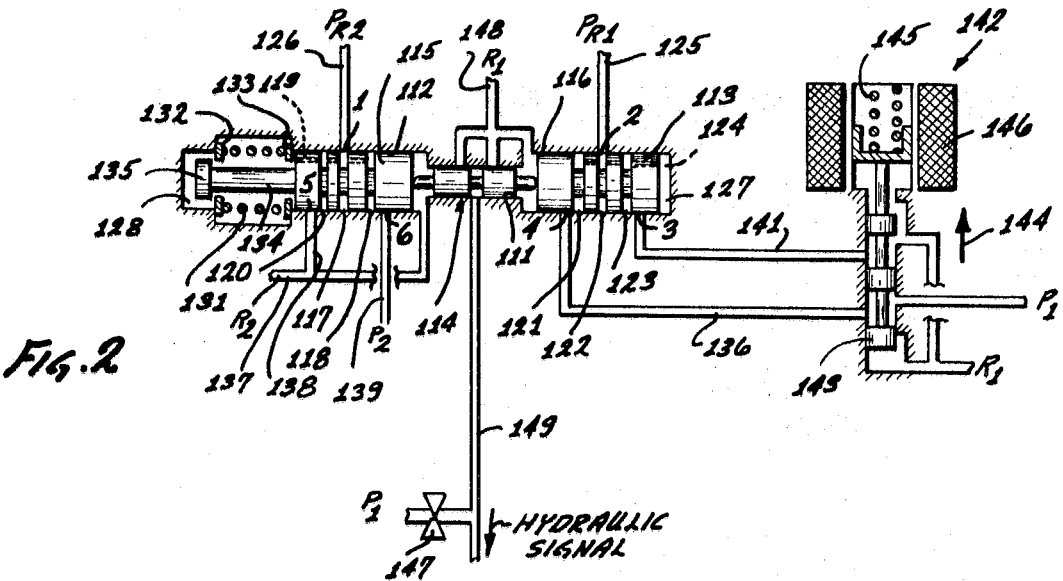
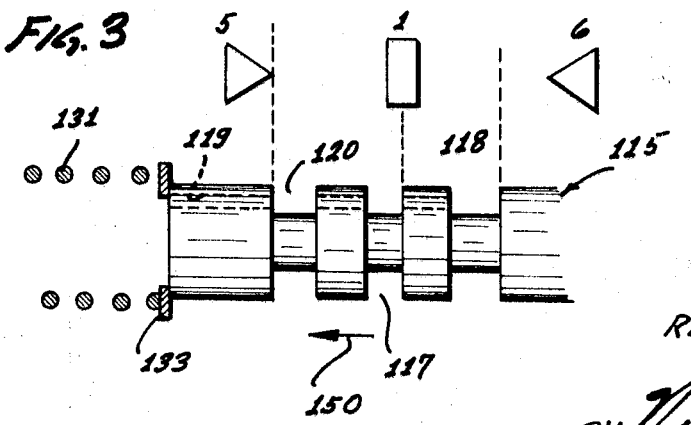
INVENTOR
RICHARD K. MASON
BY Nilsson + Robbins
ATTORNEYS

LATCHING COMPARATOR

FIELD OF THE INVENTION

This invention relates generally to fluid-handling systems, and more particularly to apparatus for use in such systems which is adapted to compare hydraeric pressure signals and detect differences therein.

BACKGROUND OF THE INVENTION

It is very often desirable to measure two hydraeric signals in order to ascertain any disparity therebetween. In the event such a disparity, in fact, occurs, it is desirable to develop a signal indicative thereof. The signal thus developed may be utilized for warning purposes or alternatively to operate additional equipment for any desired a end result. When such a disparity does occur in the compared signals, it is very often desirable to preclude the comparator apparatus from returning to a position such that the disparity-indicating signal is eliminated (a lockout condition).

Prior art apparatus for accomplishing such comparison and such lockout has, for the most part, included relatively complex electronic or electrical equipment and in those cases where hydraeric systems have been involved, relatively complex mechanism has been required. By utilization of electronic equipment, it is normally required that the same be maintained in a predetermined ambient condition, at least insofar as cleanliness and temperature are concerned. Furthermore, reliability of such electronic equipment, particularly under rugged operating conditions, can be somewhat questionable. Furthermore, the more complex the hydraulic system becomes, the more likelihood there is of failure; that is, the reliability thereof becomes less.

In the presently known hydraeric or hydraulic systems which accomplish the foregoing stated results, at least two separate valves have been required.

The best prior art known at the present time is U.S. Pat. No. 3,391,611 issued Jul. 9, 1968 to G. D. Jenney for "Hydraeric Control System" and U.S. Pat. No. 3,406,702 issued Oct. 22, 1968 to G. D. Jenney for "Apparatus for Comparing Hydraeric Pressure Signals and Detecting Disparity Therebetween."

SUMMARY OF THE INVENTION

A latching comparator in accordance with the present invention includes differential pressure-responsive means movable in opposite directions in response to a predetermined differential pressure being applied thereto. Upon movement in either direction responsive to the differential pressure being applied thereto, passageway means is adapted to become operable to apply a pressure signal to said differential pressure-responsive means to move the same through its full motion capability and maintain the same in such position.

BRIEF DESCRIPTION OF THE DRAWING

FIG. 1 illustrates schematically a comparator apparatus which latches in accordance with the principles of the present invention;

FIG. 2 shows schematically one form which structure constructed in accordance with the present invention may take; and FIG. 3 illustrates a low leakage configuration for a structure of the present invention.

DESCRIPTION OF THE EMBODIMENTS ILLUSTRATED

Referring now to FIG. 1, there is illustrated a latching comparator constructed in accordance with the present invention. As is shown, there is provided a bore 11 having enlarged end chambers 12 and 13. A spool valve illustrated generally at 14 is positioned within the bore 11 and is adapted to move in opposite directions therein. The spool valve 14 includes lands 15 and 16 interconnected by a reduced diameter portion 17. Land 15 also includes a reduced diameter portion 18 defining a continuous annulus 18'. The land 16 defines a reduced diameter portion 19 defining an annulus 19' which is continuous about the land 16. The land 15 has an end area 21 exposed to the chamber 12 and defining a reentrant bore 22. An opening 23 is defined through the reduced diameter portion 18 in the land 15 to thus provide communication between the annulus 18' and the chamber 12 through the reentrant bore 22. The land 16 defines an end area 24 exposed to the chamber 13. The end area 24 also defines a reentrant bore 25. The reduced diameter portion 19 defines an opening 26 therethrough thus establishing communication from the annulus 19' and the chamber 13 through the reentrant bore 25.

A spring 27 is held in position between the end wall 28 of the chamber 12 and the retaining ring 29 and establishes a predetermined force against which the spool valve 14 must work when moving toward the left as viewed in FIG. 1. A stop 31 is positioned within the chamber 12 and limits the amount of movement which the spool valve 14 can have when moving in the first direction, that is, toward the left as viewed in FIG. 1. A second spring 32 is positioned within the chamber 13 between the end wall 33 thereof and a second retainer ring 34. The spring 32 functions in the same manner as does the spring 27 while a second stop 35 functions to limit the travel of the spool valve 14 in a second direction, that is, toward the right as viewed in FIG. 1.

A first pressure $P_{R1}$ to be compared is applied through a passageway means 36 to a port 37 defined by the bore 11 which communicates with the continuous annulus 18', thus permitting the hydraeric fluid to pass through the opening 23, the reentrant bore 22, and into chamber 12. A second pressure signal to be compared $P_{R2}$ is applied through a second passageway means 38 and through a second port 39 defined by the bore 11 which communicates with the continuous annulus 19'. Thus the hydraeric fluid $P_{R2}$ is permitted to pass through the opening 26, the reentrant bore 25, and into the chamber 13.

Thus the pressure of the hydraeric signal $P_{R1}$ acting against the end area 21 produces a force tending to move the spool valve toward the right as viewed in FIG. 1, while simultaneously the pressure of the hydraeric signal $P_{R2}$ acting against the end area 24 produces a force tending to move the spool valve 14 toward the left as viewed in FIG. 1. As a result thereof, since as illustrated the end areas 21 and 24 are substantially equal in area, the spool valve 14 is responsive only to a difference in the forces or, since the end areas are equal, a difference in the pressures of the two signals $P_{R1}$ and $P_{R2}$.

Assuming that there is a differential pressure between the hydraeric signals $P_{R1}$ and $P_{R2}$ such that the spool valve 14 is caused to move in either direction, for example toward the left, the end area 21 will first strike the retainer ring 29 and the force produced will have to be sufficient to overcome the force of the spring 27 before the spool valve 14 will be permitted to move further toward the left. Thus, minor changes in the pressure of the signal will not have any effect upon the system.

Assuming that the force produced is such as to depress the spring 27, the spool valve is caused to move further toward the left as viewed in FIG. 1. As such movement occurs, the annulus 19' opens port 41 which is connected through passageway means 42 to system pressure $P_S$. The magnitude of system pressure $P_S$ is selected so that it is always substantially greater than the pressure of either of the hydraeric signals to be compared $P_{R1}$ or $P_{R2}$. It should also be noted that as port 41 is opening, port 39 is closing to preclude system pressure from being applied for any significant period of time through passageway means 38 to any portion of the system wherein damage might occur. As source of system pressure $P_S$ is connected through the port 41 to the continuous annulus 19, it will be readily recognized that the fluid is applied through the opening 26 and the reentrant port 25 to the chamber 13. Thus, the force created by the pressure of system pressure $P_S$ operating against the end area 24 of the land 16 causes the spool 14 to continue to move toward the left until the retainer ring 29 contacts the stop 31. Under these conditions, the annulus 19' is fully positioned over the port 41. During the same time the port 41 was being opened to annulus 19', a port 43 connected to passageway means 44 which communicates with system return $R_S$ was also being opened by annulus 18'. Therefore, system return $R_S$ is communicated through the opening 23 and the reentrant port 22 to the chamber 12 simultaneously with the communication of system pressure $P_S$ to the chamber 13 as above described. Simultaneously port 37 is closed to prevent return entering the system wherein signal $P_R$ is generated.

As the spool valve 14 moves toward the left, a port 45 which is connected through a passageway means 46, 46' to system return is opened, thereby communicating system return through the bore 11 between lands 15 and 16 to a conduit 47 to the system for use as may be desired. It will be recognized by those skilled in the art that system pressure $P_S$ could be interconnected in this manner if such is desired. Similarly, if the spool valve were to move in the opposite direction, system return would be connected to port 48 through passageway means 46—46" and to the system through the conduit 47. It can therefore be seen that if sufficient difference exists between the hydraeric signals $P_{R1}$ and $P_{R2}$, the spool valve 14 is moved to its limit position and is latched in that position by the application of system pressure, such pressure being greater than either pressure being compared.

Similarly, if the spool valve 14 were to move toward the right as a result of the pressure at signal $P_{R1}$ being greater than that at $P_{R2}$ by an amount sufficient to depress the spring 32, system pressure would be applied through the passageway means 51 to the port 52 and thus to the chamber 12 in a manner as above described, thereby latching the spool valve 14 against the stop member 35 at the limit of its movement toward the opposite direction, toward the right as viewed in FIG. 1. During this time, system pressure $R_S$ would be connected through the passageway means 53 to the port 54 to assist in the latching operation.

Referring now to FIG. 2 there is illustrated a latching comparator constructed in accordance with the principles of the present invention but in which there is provided the additional capability of resetting the comparator after it has latched into its limit position. As is illustrated in FIG. 2, there is defined a bore 111 having a first enlarged area 112 and a second enlarged area 113. A spool assembly is slidably positioned within the bore 111 and includes spool valve 114 sandwiched between a spool 115 positioned in the enlarged area 112 and spool 116 positioned in the enlarged area 113. The spool 115 defines three reduced diameter portions in the form of annuli 117, 118, and 120. An opening 119 extends through the lands of the spool 115 to provide continuous communication between the three annuli 117, 118, and 120. Similarly, the spool 116 defines three reduced diameter portions in the form of annuli 121, 122 and 123 and an opening 124 extends through the lands of the spool 116 to provide continuous communication between the annuli 121, 122 and 123. Pressure signal $P_{R1}$ is communicated through a passageway 125 to the enlarged bore 113 so as to communicate with the annulus 122 and through the opening 124 to the chamber 127. The second pressure signal $P_{R2}$ is communicated through the passageway 126 to the annulus 117 and through the opening 119 to the chamber 128. A single spring 131 is positioned within the chamber 128 between the retainer rings 132 and 133. An extension 134 of the spool 115 terminates in an enlarged end portion 135 which functions to restrain movement of the spool 114 toward the right by engaging the retainer ring 132, thus applying the spring constant of the spring 131 to restrain movement of the spool 114 toward the right. Similarly, if the spool 114 tends to move toward the left, the retainer 133 is engaged thereby, thus applying the spring constant to resist such movement in a manner as above described. As a result of this construction, therefore, a single spring may be utilized to obtain the desired magnitude of differential pressure required for movement of the spool (preload). The limit of movement in either direction of the spool is accomplished by the end walls of the chambers 127 and 128.

As above described, if the pressure signal present at $P_{R1}$ is greater than that at $P_{R2}$, the spool will move toward the left, thus applying system pressure $P_1$ through the passageway means 136 to the annulus 121 and through the opening 124 to the chamber 127, thus driving the spool 114 to its limit in that direction. Simultaneously, system return $R_2$ will be applied through conduits 137 and 138 to the annulus 116, thus communicating system return to the chamber 128. Movement in the opposite direction, that is, toward the right, causes system pressure $P_2$ to be applied through the conduit 139 to the annulus 118, thus driving the spool 114 toward the right to its limit. At the same time, system return $R_1$ is connected through the passageway 141 to the annulus 123, assisting in the latching operation. It is assumed that system pressures $P_1$ $P_2$ are equal in magnitude.

To reset the apparatus as illustrated in FIG. 2, a signal may be applied to the solenoid illustrated generally at 142 causing the spool 143 to move upwardly in the direction of the arrow 144 against the spring 145. A signal may be applied in any manner desired, such as by the operator applying an electrical current to the coil 146 of the solenoid as is well known in the prior art. As the spool 143 moves upwardly, system pressure $P_1$ is removed from conduit 136 and system pressure $R_1$ is applied thereto while simultaneously system return $R_1$ is removed from the conduit 141 and system pressure $P_1$ is applied thereto. Therefore, assuming the spool 114 is all the way toward the right as viewed in FIG. 2, system pressure is applied to annulus 123 and through the opening 124 to the chamber 127, thereby balancing the force applied by system pressure $P_2$ present in the chamber 128. Under these circumstances, therefore, the spring constant of the spring 131 returns the spool toward the left to a balanced position, thereby returning it to its quiescent condition and removing the system return $R_1$ from communication with the system as a signal that a differential in pressure has occurred sufficient to cause translation of the comparator to its latching position. If the spool valve had translated toward the left as viewed in FIG. 2 so that latching can occur, upon energization of the solenoid 142 similar reversals of system pressure and return would occur causing the spool valve 114 to again center itself in a manner as above described.

As is illustrated in FIG. 2, a hydraeric signal may be applied to the system through the conduit 149 from the source $P_1$ through the restriction orifice 147. Upon translation of the spool 114 in either direction, it can be seen that system return $R_1$ will be connected through the conduit 148 to the conduit 146. Since the restriction orifice 147 is in the line between source of system pressure $P_1$ and conduit 149, a sudden drop in the pressure appearing in line 149 will occur, thus providing a signal that the spool valve 114 has translated and been latched in its limit position in either of the two directions. This sudden drop in pressure may be utilized for any purpose desired as above referred to.

In some cases leakage may become a problem. Such leakage may be minimized by shaping the ports associated with the latching function to minimize the open area thereof until the ports associated with the compared signals have been closed. One such shaping form and position is illustrated in FIG. 3. The numbers used for the annuli and spool are from FIG. 2. The rectangular symbol represents the port 1 and the triangular symbol the port 5 from FIG. 3. The spool 115 is shown moving to the left per arrow 150 and is at the point where contact has just been made with the retainer ring 133 but before the spring 131 has been depressed. As is shown port 1 is partially closed and port 5 is completely closed. As movement to the left continues port 5 is completely closed. As movement to the left continues, port 5 is barely cracked since only the apex of the triangle is uncovered. As can be seen, a substantial amount of port 5 is maintained covered until port 1 is completely covered. Such minimizes communication (leakage) between ports 1 and 5 during spool 115 movement to the left. Similar analysis may be made with respect to ports 1 and 6 during movement to the right of spool 115. Ports 2, 3 and 4 would be similarly constructed.

I claim:
1. Latching comparator means for detecting disparity between fluid pressure signals and locking in a disparity-indicating position comprising:
  1. pressure-responsive means having first and second areas and disposed to move in first and second directions to limits upon the application of unequal fluid pressure signals to said areas;
  2. first and second passageway means connected to apply first and second fluid pressure signals to be compared to said first and second areas respectively, said pressure responsive means moving in said first direction when said first fluid pressure signal exceeds said second fluid pressure signal and in said second direction when said second fluid pressure signal exceeds said first fluid pressure signal;
  3. third and fourth passageway means connecting a source of fluid pressure and return respectively to said pressure-responsive means and adapted to override said first and second fluid pressure signals after said pressure-responsive means has moved a predetermined distance in either of said first and second directions, said source of fluid pressure moving said pressure-responsive means to said limit position and retaining said pressure-responsive means thereat irrespective of changes in said first and second fluid pressure signals; and
  4. signal-generating means coupled to said pressure-responsive means for providing a signal indicative of movement of said pressure-responsive means in said first or said second direction.

2. Latching comparator means as defined in claim 1 which further includes movement-restraining means disposed to preclude movement of said pressure-responsive means to its limit position until a predetermined differential exists between said first and second pressure signals.

3. Latching comparator means as defined in claim 1 wherein said pressure-responsive means is a spool slidably received in a bore defining, with said end areas, first and second chambers, said first and second passageway means being connected to said bore at first and second port means respectively, said third and fourth passageway means being connected to said bore at third and fourth port means respectively, said spool providing communication between said third and fourth passageway means and said first and second areas respectively only when said spool moves a predetermined distance.

4. Latching comparator means as defined in claim 3 wherein said spool defines first and second reduced diameter portions and an opening providing communication between said first and second chambers and said first and second reduced diameter portions respectively, said spool maintaining communication between said first and second compared signals and said first and second chambers respectively when said compared signals are substantially equal, and said spool providing communication bet between said of pressure and said first chamber when said spool moves in said first direction and said source of pressure and said second chamber when said spool moves in said second direction.

5. Latching comparator means as defined in claim 4 which further includes reset valve means, said third and fourth passageways being connected through said reset valve means thereby to connect said source of pressure to said fourth passageway and said return to said third passageway to selectively reset said comparator upon operation of said reset valve.

6. Latching comparator means as defined in claim 4 wherein said third and fourth port means is positioned with respect to said spool to minimize simultaneous communication between said first and second compared signals and said source of pressure or return.